(12) United States Patent
Bailey et al.

(10) Patent No.: US 9,455,977 B1
(45) Date of Patent: Sep. 27, 2016

(54) REMOTE MANAGEMENT INTERFACE USING CREDENTIALS ASSOCIATED WITH RESPECTIVE ACCESS CONTROL INTERVALS

(71) Applicant: EMC Corporation, Hopkinton, MA (US)

(72) Inventors: Daniel V. Bailey, Pepperell, MA (US); Bradley Berg, N. Smithfield, RI (US)

(73) Assignee: EMC Corporation, Hopkinton, MA (US)

( * ) Notice: Subject to any disclaimer, the term of this patent is extended or adjusted under 35 U.S.C. 154(b) by 200 days.

(21) Appl. No.: 14/310,264

(22) Filed: Jun. 20, 2014

(51) Int. Cl.
G06F 7/04 (2006.01)
G06F 17/30 (2006.01)
H04L 29/06 (2006.01)

(52) U.S. Cl.
CPC .................................. H04L 63/08 (2013.01)

(58) Field of Classification Search
CPC . H04L 63/08; H04L 63/083; H04L 63/0861; H04W 12/06; G06F 21/31
USPC .......................................................... 726/5
See application file for complete search history.

(56) References Cited

U.S. PATENT DOCUMENTS

| | | | |
|---|---|---|---|
| 7,152,165 B1 | 12/2006 | Maheshwari et al. | |
| 7,299,354 B2 | 11/2007 | Khanna et al. | |
| 7,788,728 B2 | 8/2010 | Kim et al. | |
| 8,180,907 B1 | 5/2012 | Seshadri et al. | |
| 8,234,492 B2 | 7/2012 | Kim et al. | |
| 8,316,248 B2 | 11/2012 | Yokota et al. | |
| 8,522,038 B2 | 8/2013 | Lu et al. | |
| 2005/0182843 A1* | 8/2005 | Reistad | H04L 43/0817 709/230 |
| 2005/0256910 A1 | 11/2005 | Kim et al. | |
| 2007/0150744 A1 | 6/2007 | Cheng et al. | |
| 2007/0174614 A1 | 7/2007 | Duane et al. | |
| 2007/0279227 A1* | 12/2007 | Juels | H04L 63/0492 340/572.1 |
| 2008/0172482 A1 | 7/2008 | Shah | |
| 2009/0254754 A1 | 10/2009 | Bellur et al. | |
| 2012/0151563 A1 | 6/2012 | Bolik et al. | |
| 2012/0260320 A1* | 10/2012 | Keeler | H04W 12/10 726/4 |

(Continued)

OTHER PUBLICATIONS

Apple, "Archived—What is Lights Out Management?" http://support.apple.com/kb/ta24506, Feb. 2012, 1 page.

(Continued)

Primary Examiner — Kambiz Zand
Assistant Examiner — Stephen Sanders
(74) Attorney, Agent, or Firm — Ryan, Mason & Lewis, LLP (57) ABSTRACT

A processing device comprises a processor coupled to a memory and is configured to obtain a credential associated with a particular access control interval, to insert information derived from the credential into one or more messages of a remote management interface protocol, to transmit the one or more messages to a managed device, and to remotely control the managed device responsive to a successful authentication based at least in part on the inserted information. The one or more messages of the remote management interface protocol are illustratively compliant with a designated Intelligent Platform Management Interface (IPMI) specification. The credential associated with the particular access control interval may be generated based at least in part on a corresponding intermediate value of a hash chain. For example, the credential may be generated based at least in part on a message authentication code and the corresponding intermediate value of a hash chain.

20 Claims, 4 Drawing Sheets

(56) References Cited

U.S. PATENT DOCUMENTS

2013/0263205 A1    10/2013  Jacobs
2014/0068238 A1     3/2014  Jaber et al.

OTHER PUBLICATIONS

Hewlett Packard, "HP Integrated Lights-Out (iLO)," http://h17007.www1.hp.com/us/en/enterprise/servers/management/ilo/index.aspx, 2014, 4 pages.

Oracle, "Oracle Integrated Lights Out Manager," http://www.oracle.com/technetwork/server-storage/servermgmt/tech/integrated-lighhts-out-manager/ilom-362784.html, Jun. 2014, 2 pages.

Jordan Hargrave, "An Introduction to the Intelligent Platform Management Interface," System Architecture, Power Solutions, Jun. 2004, pp. 85-87.

"-IPMI—Intelligent Platform Management Interface Specification, Second Generation, v2.0," Document Revision 1.1, Oct. 2013, 644 pages.

B. Groza et al., "On the Use of One-Way Chain Based Authentication Protocols in Secure Control Systems," Second International Conference on Availability, Reliability and Security (ARES), The International Dependability Conference—Bridging Theory and Practice, Apr. 2007, pp. 1214-1221, Vienna, Austria.

I. Dacosta et al., "Proxychain: Developing a Robust and Efficient Authentication Infrastructure for Carrier-Scale VoIP Networks," USENIX Annual Technical Conference (ATC), Jun. 2010, 14 pages.

G. Lenzini et al., "Selective Location Blinding Using Hash Chains," 19th International Workshop on Security Protocols XIX, Lecture Notes in Computer Science (LNCS), Mar. 2011, pp. 132-141, vol. 7114, Cambridge, United Kingdom.

K. Ren et al., "A Novel Privacy Preserving Authentication and Access Control Scheme for Pervasive Computing Environments," IEEE Transactions on Vehicular Technology, Jul. 2006, pp. 1373-1384, vol. 55, No. 4.

U.S. Appl. No. 13/931,083 filed in the name of D.V. Bailey et al. on Jun. 28, 2013 and entitled "Protected Resource Access Control Utilizing Credentials Based on Message Authentication Codes and Hash Chain Values."

U.S. Appl. No. 13/629,771 filed in the name of D.V. Bailey et al. on Sep. 28, 2012 and entitled "Protected Resource Access Control Utilizing Intermediate Values of a Hash Chain."

* cited by examiner

FIG. 4A

| FIELD NAME | CHANNEL NUMBER | REQUESTED PRIVILEGE LEVEL |
|---|---|---|
| LENGTH (BYTES) | 1 | 1 |

GetAuthenticationCapabilities.request Frame Format

FIG. 4B

| FIELD NAME | COMPLETION CODE | CHANNEL NUMBER | AUTHENTICATION TYPE | STATUS |
|---|---|---|---|---|
| LENGTH (BYTES) | 1 | 1 | 1 | 1 |

GetAuthenticationCapabilities.response Frame Format

FIG. 4C

| FIELD NAME | REQUESTED PRIVILEGE LEVEL | LENGTH | USERNAME |
|---|---|---|---|
| LENGTH (BYTES) | 1 | 1 | 20 |

MODIFIED RAKP MESSAGE 1 FRAME FORMAT

FIG. 4D

| FIELD NAME | SESSION ID | KEY EXCHANGE AUTHENTICATION CODE |
|---|---|---|
| LENGTH (BYTES) | 4 | 20 |

MODIFIED RAKP MESSAGE 3 FRAME FORMAT

REMOTE MANAGEMENT INTERFACE USING CREDENTIALS ASSOCIATED WITH RESPECTIVE ACCESS CONTROL INTERVALS

FIELD

The field relates generally to information security, and more particularly to techniques for controlling access to protected resources.

BACKGROUND

Many computers, servers, storage devices and other types of processing devices are configured with remote management interfaces that allow administrators or other service personnel to access a given such device from a remote location even if the device is in a powered-down state. By way of example, a remote management interface of this type can be used to turn the device on and off, reboot or reinstall its operating system, access its sensors, and perform numerous other tasks. Interfaces of this type are often referred to as providing "out-of-band management" or "lights out management" functionality.

Some remote management interfaces utilize standardized protocols, such as Intelligent Platform Management Interface (IPMI) Specification, Second Generation, v2.0, October 2013, which is incorporated by reference herein.

Unfortunately, IPMI has a number of serious security deficiencies. For example, it typically relies on static passwords. Moreover, a flaw in the design of IPMI allows the performance of offline password-guessing attacks. Such deficiencies can be particularly problematic in view of common practices such as selecting weak passwords or sharing the same password over multiple devices within a given enterprise domain. For example, in some installations, learning a single password can give an attacker the ability to access thousands of devices. Also, a given password shared by multiple devices may also be accessible to multiple administrators, leading to additional vulnerability, particularly in the presence of turnover in administrative positions. Other protocols utilized in conventional remote management interfaces exhibit similar security deficiencies.

SUMMARY

Illustrative embodiments of the present invention provide a remote management interface that utilizes credentials associated with respective access control intervals. The remote management interface in some embodiments is implemented in a manner that is compliant with the above-noted IPMI specification but avoids the use of static passwords while also substantially eliminating the possibility of offline password-guessing attacks.

In one embodiment, a processing device comprises a processor coupled to a memory and is configured to obtain a credential associated with a particular access control interval, to insert information derived from the credential into one or more messages of a remote management interface protocol, to transmit the one or more messages to a managed device, and to remotely control the managed device responsive to a successful authentication based at least in part on the inserted information. The processing device in this embodiment illustratively comprises a remote device configured to communicate with the managed device over a network.

In another embodiment, a processing device comprises a processor coupled to a memory and is configured to receive one or more messages of a remote management interface protocol, to extract from the one or more messages information derived from a credential associated with a particular access control interval, and to permit remote control of the processing device responsive to a successful authentication based at least in part on the extracted information. The processing device in this embodiment illustratively comprises a managed device configured to communicate with a remote device over a network.

Other embodiments include but are not limited to methods, apparatus, systems and articles of manufacture comprising processor-readable storage media.

The credential associated with the particular access control interval in one or more of the illustrative embodiments is generated based at least in part on a corresponding intermediate value of a hash chain. For example, the credential may be generated based at least in part on a message authentication code and the corresponding intermediate value of a hash chain. Numerous other types of credentials based on intermediate values of a hash chain or other cryptographic constructs may be used.

DETAILED DESCRIPTION

Illustrative embodiments of the present invention will be described herein with reference to exemplary information processing systems and associated computers, servers, storage devices and other types of processing devices. It is to be appreciated, however, that the invention is not restricted to use with the particular illustrative system and device configurations shown. Accordingly, the term "information processing system" as used herein is intended to be broadly construed, so as to encompass, for example, any processing system comprising at least one processing platform, including systems comprising virtual machines and other cloud infrastructure.

Certain embodiments of the invention are configured to utilize techniques disclosed in U.S. patent application Ser.

No. 13/629,771, filed Sep. 28, 2012 and entitled "Protected Resource Access Control Utilizing Intermediate Values of a Hash Chain," and U.S. patent application Ser. No. 13/931,083, filed Jun. 28, 2013 and entitled "Protected Resource Access Control Utilizing Credentials based on Message Authentication Codes and Hash Chain Values," both of which are commonly assigned herewith and incorporated by reference herein. However, it is to be appreciated that use of such techniques is not a requirement of embodiments of the present invention.

Figure 1:
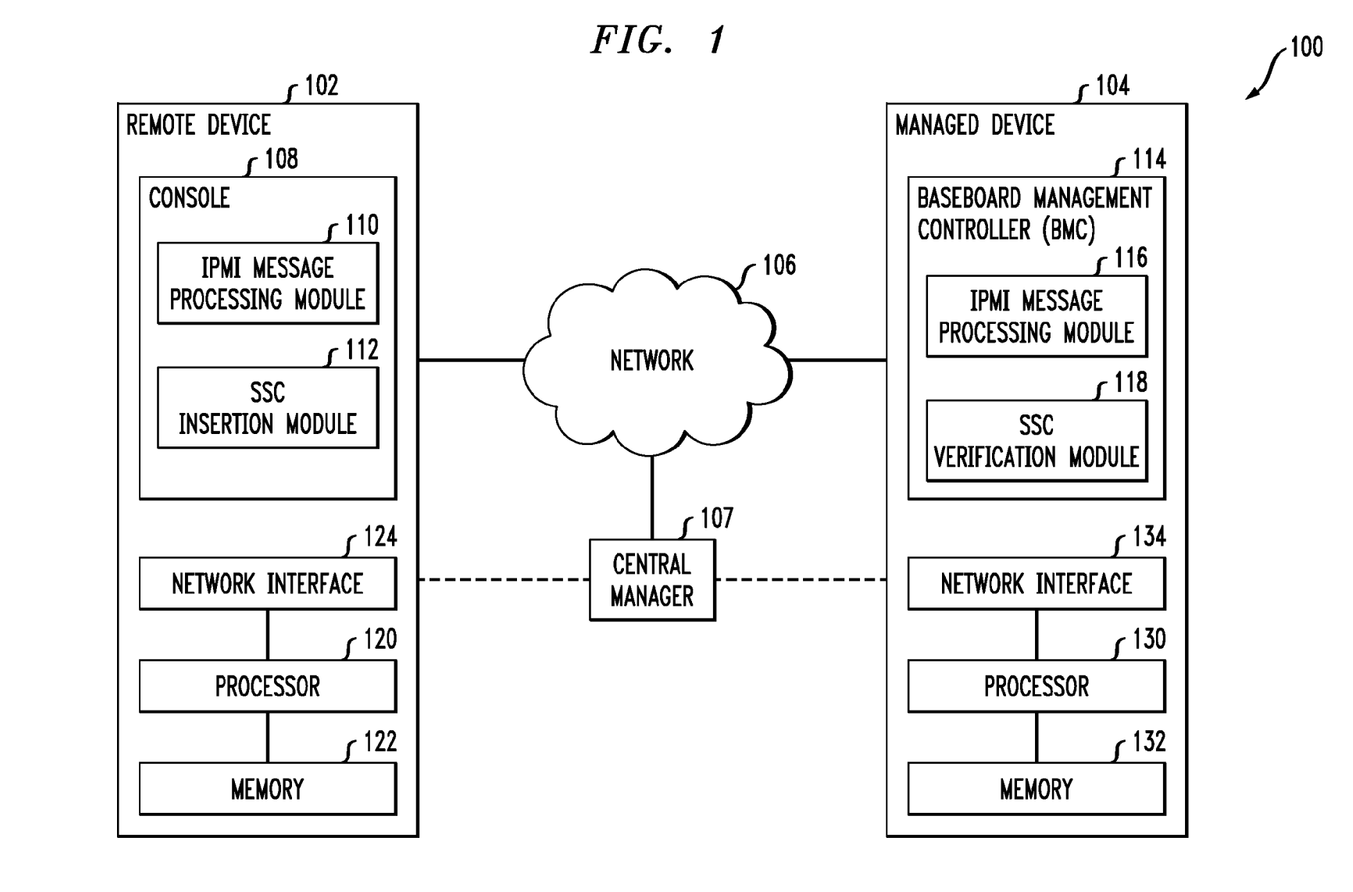
FIG. 1 shows an information processing system configured to implement a remote management interface for a processing device using credentials associated with respective access control intervals in an illustrative embodiment of the invention.

FIG. 1 shows an information processing system 100 configured in accordance with an illustrative embodiment of the invention. The system 100 comprises a first processing device 102 and a second processing device 104 that communicate with one another over a network 106. Also coupled to the network 106 is a central manager 107. The central manager 107 illustratively also communicates with the devices 102 and 104 via additional communication channels not necessarily implemented over the network 106, as shown by the dashed lines in the figure.

The central manager 107 in the present embodiment is assumed to incorporate credential generation functionality, such as a credential generation module, and possibly related functionality for key provisioning, user account creation and user authentication. Exemplary implementations of such functionality are disclosed in the above-referenced U.S. patent application Ser. Nos. 13/629,771 and 13/931,083.

In other embodiments, the central manager 107 can be eliminated, and the credentials can be generated in the first processing device 102. For example, the credentials in some embodiments can comprise respective one-time passcodes or other types of tokencodes generated by a hardware or software authentication token implemented in or otherwise associated with the first processing device 102.

The first and second processing devices 102 and 104 in this example are more particularly referred to herein as a remote device and a managed device, respectively, with the remote device being configured to control the managed device using a remote management interface protocol. This involves the remote device 102 and the managed device 104 exchanging messages, as will be described in more detail below. It is assumed that the messages are compliant with the above-referenced IPMI specification, although other types of message formats and remote management interface protocols can be used in other embodiments.

Also, although the first and second processing devices 102 and 104 are configured in the present embodiment as respective remote and managed devices, this is by way of example only. In other embodiments, a single device can operate as a remote device relative to one device and as a managed device relative to another device. Thus, it is possible for a single device to include functionality for both remotely managing other devices and also for being remotely managed by other devices.

The remote device 102 comprises a console 108 that includes an IPMI message processing module 110 and a secure service credential (SSC) insertion module 112. An SSC is an example of what is more generally referred to herein as a credential associated with a particular access control interval.

The managed device 104 comprises a baseboard management controller (BMC) 114 that includes an IPMI message processing module 116 and an SSC verification module 118. The modules 116 and 118 may be collectively viewed as an example of what is more generally referred to herein as an "access control module" of the managed device 104. Other arrangements of access control modules can be used in other embodiments.

The console 108 and BMC 114 illustratively incorporate well-known conventional IPMI functionality as described in the above-referenced IPMI specification, suitably modified in the manner described below to support use of SSCs or other types of credentials associated with respective access control intervals.

A given one of the processing devices 102 and 104 may comprise, for example, a computer, server, storage device, mobile telephone or other type of processing device. In one possible remote management scenario, the remote device 102 comprises a mobile telephone and the managed device 104 comprises a desktop computer. Numerous other operating scenarios involving a wide variety of different types and combinations of processing devices are possible, as will be appreciated by those skilled in the art.

The network 106 may comprise, for example, a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

As mentioned above, the SSCs are illustratively generated by the central manager 107. In order to obtain access to the managed device 104 in a given access control interval, a user associated with the remote device 102 authenticates to the central manager 107 and obtains the SSC corresponding to that access control interval. It is assumed in an embodiment of this type that the user has previously established a user account with the central manager 107. It is further assumed that the managed device 104 has been previously provisioned with information from the central manager 107 that allows SSC verification module 118 to verify the SSC or portions thereof when supplied to the managed device 104 from the remote device 102 in one or more IPMI messages.

By way of example, in provisioning the managed device 104, a token may be installed on the device in a secure manner using encryption. Such an installed token in some embodiments comprises a final value of a hash chain as well as a random nonce used as an integrity check for the SSC. These two values may be implemented as respective 128-bit values, although other types and combinations of values can be used.

A more particular example of the above-noted random nonce is referred to elsewhere herein as a MAC key in that it is utilized in verifying an SSC that includes an embedded MAC, where MAC denotes message authentication code.

Figure 5:
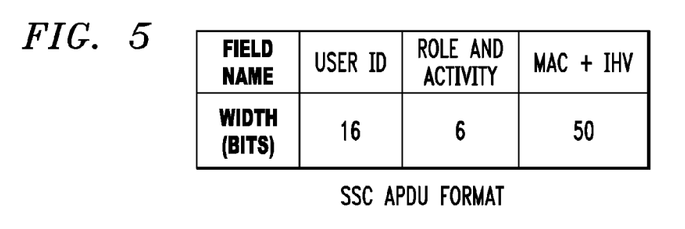
FIG. 5 shows an exemplary format of a credential generated based at least in part on a message authentication code and an intermediate value of a hash chain.

The SSCs in some embodiments are in the form of respective SSC application protocol data units (APDUs), although a wide variety of other credential formats may be used in other embodiments. One possible SSC APDU format is shown in FIG. 5, but terms such as SSC and SSC APDU as used herein are intended to be broadly construed so as to encompass, for example, numerous other types of binary or encoded credentials, as well as other types of credentials associated with respective access control intervals.

As will be described in more detail below, a given SSC in the present embodiment is configured to allow the managed device 104 to identify an accessing user, to confirm that the user has presented an appropriate password, and to determine the particular level of access appropriate for that user.

The user provides via remote device 102 the same password that was used to authenticate to the central manager 107. Additional authentication information such as a user name or PIN may also be required. However, it is to be appreciated that embodiments of the invention do not require the use of such additional authentication data. For example, embodiments can be configured in which users share no previously-agreed user name or PIN with the managed device 104 or its associated SSC verification module 118, and instead utilize only the SSC APDU and the user password to gain access to the managed device 104 via the remote device 102.

The term "password" as used herein is intended to be broadly construed so as to encompass passcodes, passphrases and other arrangements of multiple characters or other information utilized in authentication. For example, one-time passcodes generated by a hardware or software authentication token are considered passwords as the latter term is broadly used herein.

The term "user" as utilized herein is intended to be broadly construed so as to encompass, for example, a human user associated with a given device or set of devices, an automated user such as an application or other hardware or software component associated with a given device, or any other entity that may control that device.

As indicated above, the managed device 104 comprising SSC verification module 118 is provisioned by the central manager 107. The provisioned information illustratively includes a final value of a hash chain and a MAC key. Such information is provisioned by the central manager 107 over a secure channel with the managed device 104. After provisioning, the managed device 104 may be completely disconnected from the central manager 107 such that future communications between the central manager 107 and the managed device 104 flow through the remote device 102 with support of one or more associated users. Accordingly, after the appropriate information has been provisioned to the managed device 104, there is no need for continued network connectivity between the managed device 104 and the central manager 107 or any associated credential generation module.

An exemplary remote management interface process implemented in system 100 will now be described with reference to the flow diagram of FIG. 2. It is to be understood that this particular process is exemplary only, and additional or alternative processes can be carried out in other embodiments.

In this embodiment, the exemplary remote management interface process includes steps 200 through 206, which are assumed to be performed by the remote device 102 in interacting with the managed device 104.

In step 200, the remote device 102 obtains an SSC associated with a particular access control interval. For example, the SSC may be obtained for a current access control interval by the SSC insertion module 112.

As will be described in more detail below in conjunction with FIGS. 5, 6 and 7, an SSC associated with a particular access control interval may be generated based at least in part on a corresponding intermediate value of a hash chain, and more particularly may be generated based at least in part on a message authentication code and the corresponding intermediate value of a hash chain.

Although the SSC is illustratively generated in the central manager 107, in other embodiments the SSC may be generated in the remote device 102 itself or in another system entity. Also, the central manager 107 may be configured to communicate with multiple remote devices and multiple managed devices, and can therefore generate SSCs for each of multiple remote devices to utilize in accessing one or more managed devices.

In generating a given SSC based at least in part on a corresponding intermediate value of a hash chain, an initial value of the hash chain is obtained, the initial value is hashed a designated number of times to obtain a final value of the hash chain, and intermediate values of the hash chain are associated with respective access control intervals.

Accordingly, a given hash chain can be generated by applying multiple iterations of a designated one-way hash function to an initial value in order to obtain respective ones of the intermediate values and the final value, where the number of intermediate values of the hash chain in some embodiments corresponds to the desired number of access control intervals to be supported.

The hash function used to generate the hash chain may comprise any of a number of different known one-way hash functions or key derivation functions, including by way of example MD5, SHA-1, SHA-256 and BCrypt. Additional details regarding one or more of these and other conventional hash functions that may be adapted for use in embodiments of the present invention are disclosed in A. J. Menezes et al., Handbook of Applied Cryptography, CRC Press, 1997, which is incorporated by reference herein.

The final value of the hash chain is provided to the managed device 104, using a separate secure connection established over the network 106, or via another type of channel distinct from the channel or channels used for communications associated with the remote management interface, and is utilized by the SSC verification module 118 of the managed device to verify a given SSC.

In step 202, information derived from the SSC is inserted into one or more messages of an IPMI protocol. The IPMI protocol in this embodiment is assumed to be compliant with the above-referenced IPMI specification, but modifies the content of various IPMI messages as will be described below in conjunction with FIGS. 3 and 4. Although these messages are modified to carry information derived from an SSC, they nonetheless remain compliant with the IPMI specification. Other embodiments need not necessarily maintain message compliance with any designated IPMI specification.

The information derived from the SSC may comprise at least a portion of the SSC itself, and therefore possibly the entire SSC. Accordingly, the term "derived from" in this context is intended to be broadly construed.

As one example, inserting information derived from the SSC into one or more messages of the IPMI protocol comprises inserting role information derived from a role field of the SSC into a requested privilege level field of an IPMI message of a first type.

As another example, inserting information derived from the SSC into one or more messages of the IPMI protocol comprises inserting a result of application of a function to (i) a designated portion of the credential and (ii) a computed key exchange authentication code into a key exchange authentication code (KEAC) field of an IPMI message of a second type.

These and other examples of insertion of information derived from an SSC into one or more IPMI messages will be described in additional detail below in conjunction with the exemplary frame formats of FIGS. 3 and 4.

The insertion of information derived from the SSC in step 202 is performed by the SSC insertion module 112 within the console 108.

In step 204, the one or more messages are transmitted by the remote device 102 to the managed device 104. This message transmission step in the present embodiment comprises transmitting one or more messages as part of an authentication portion of the IPMI protocol. For example, multiple messages may be exchanged between the remote device 102 and the managed device 104 in carrying out the authentication portion of the IPMI protocol. Examples of such messages will be described in greater detail below.

The transmission, reception and other processing of IPMI messages are controlled by the IPMI message processing modules 110 and 116 of the respective remote and managed devices 102 and 104.

In step 206, the managed device 104 is remotely controlled by the remote device 102 responsive to a successful authentication based at least in part on the above-noted inserted information derived from the SSC. The remote control may involve, for example, turning the managed device on and off, rebooting or reinstalling its operating system, accessing its sensors, or performing other types of tasks, in any combination. Any remote management tasks of a type commonly associated with "out-of-band management" or "lights out management" functionality may be performed without limitation.

In the present embodiment, the managed device 104 authenticates the remote device 102 before permitting the remote control to take place. For example, the managed device 104 receives the one or more messages transmitted by the remote device in step 204, extracts from the one or more messages the information derived from the SSC associated with the particular access control interval, and permits remote control of the managed device responsive to a successful authentication based at least in part on the extracted information.

As a more particular example, assume that the SSC associated with the particular access control interval is generated based at least in part on a corresponding intermediate value of a hash chain, and that the intermediate hash value or a function thereof is inserted into one or more IPMI messages as described in step 202. In this case, after the extraction of the inserted information derived from the SSC, the SSC verification module 118 identifies the particular access control interval, determines a number of hash iterations associated with the particular access control interval, applies the number of hash iterations to the intermediate value, and compares the result to the final value of the hash chain. These operations are performed in conjunction with the above-noted authentication. If the result of the application of the hash iterations does not produce the expected final value, the authentication fails.

Figure 2:
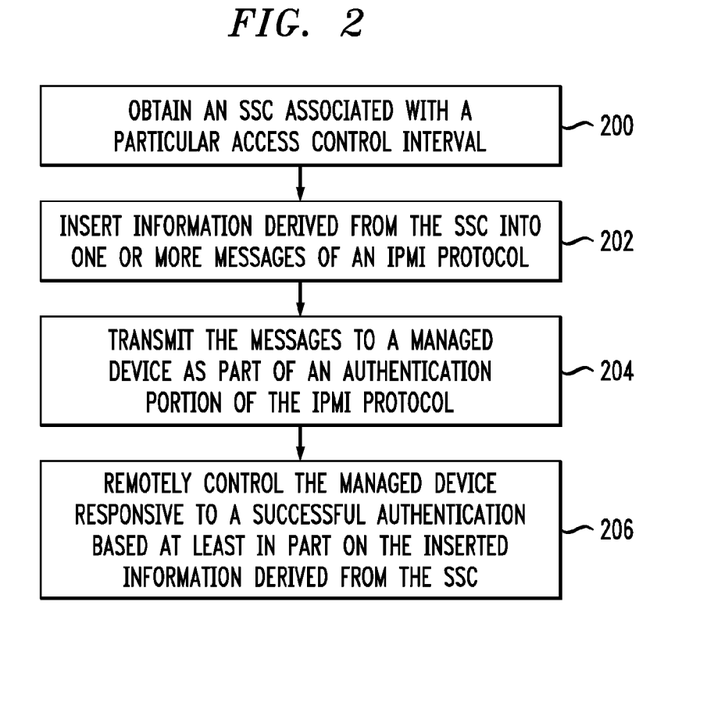
FIG. 2 is a flow diagram of an exemplary remote management interface process implemented in the system of FIG. 1.

Although the FIG. 2 process as illustrated in the figure shows remote management of a single managed device 104, separate instances of this exemplary process, possibly performed at least in part in parallel with one another, can be used to provide remote management of multiple managed devices in other embodiments.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing remote management as disclosed herein. For example, the ordering of the process steps may be varied in other embodiments, or certain steps may be performed concurrently with one another rather than serially. Also, the process steps may be repeated periodically in conjunction with respective distinct remote management instances.

The remote device 102 and managed device 104 in the FIG. 1 embodiment are implemented as respective processing devices. Each such processing device generally comprises at least one processor and an associated memory, and implements one or more functional modules for controlling certain features of the system 100.

Referring again to FIG. 1, the remote device 102 comprises a processor 120 coupled to a memory 122 and a network interface 124.

The processor 120 may comprise a microprocessor, a microcontroller, an application-specific integrated circuit (ASIC), a field-programmable gate array (FPGA) or other type of processing circuitry, as well as portions or combinations of such circuitry elements.

The memory 122 may comprise random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The network interface 124 allows the remote device 102 to communicate over the network 106 with the managed device 104, and may comprise one or more conventional transceivers.

One or both of IPMI message processing module 110 and SSC insertion module 112 of the remote device 102 may be implemented at least in part in the form of software that is stored in memory 122 and executed by processor 120.

Like the remote device 102, the managed device 104 comprises a processor 130 coupled to a memory 132 and a network interface 134.

The processor 130, like processor 120 in remote device 102, may similarly comprise a microprocessor, a microcontroller, an ASIC, an FPGA or other type of processing circuitry, as well as portions or combinations of such circuitry elements.

The memory 132, like memory 122 in remote device 102, may similarly comprise RAM, ROM or other types of memory, in any combination.

The network interface 134 allows the managed device 104 to communicate over the network 106 with the remote device 102 and may comprise one or more conventional transceivers.

One or both of IPMI message processing module 116 and SSC verification module 118 of BMC 114 in managed device 104 may be implemented at least in part in the form of software that is stored in memory 132 and executed by processor 130.

The above-noted network interfaces 124 and 134 may also be used to support various types of communication utilizing additional or alternative channels for communication of hash chain final values and other related information between system entities.

For example, a separate secure channel not involving communication over network 106 may be utilized by the central manager 107 to provide a final value of a hash chain to the managed device 104 for use by the SSC verification module 118.

It is to be understood that the particular set of elements shown in FIG. 1 for providing a remote management interface is presented by way of illustrative example only, and in other embodiments additional or alternative elements may be used. Thus, another embodiment may include additional or alternative devices and other system entities, as well as different arrangements of device modules and other components.

As mentioned previously, various elements of system 100 such as modules associated with remote device 102 and managed device 104 may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the system 100 is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products and other processing platform components may be utilized to implement at least a portion of the system 100.

The operation of the system 100 will now be described in greater detail with reference to FIGS. 3 through 7. As noted above, this embodiment provides an IPMI-compliant remote management interface that utilizes credentials associated with respective access control intervals. The credentials in some embodiments more particularly comprise respective SSCs, which as noted above may be illustratively configured in the form of SSC APDUs, although it is to be appreciated that a wide variety of alternative credential formats may be used in other embodiments. As mentioned previously, a detailed example of one possible SSC APDU format will be described below in conjunction with FIG. 5.

In accordance with the IPMI protocol, the console 108 and the BMC 114 exchange messages in order to set up a new session using information such as username and role. The exchanged messages include the following:

1. GetAuthenticationCapabilities.request from console to BMC
2. GetAuthenticationCapabilities.response from BMC to console
3. RMCP+ Open Session.request from console to BMC
4. RMCP+ Open Session.response from BMC to console
5. RAKP Message 1 from console to BMC
6. RAKP Message 2 from BMC to console
7. RAKP Message 3 from console to BMC
8. RAKP Message 4 from BMC to console In these exemplary messages, RMCP+ denotes an enhanced remote management control protocol and RAKP denotes a remote authenticated key-exchange protocol. Conventional aspects of RAKP are described in more detail in Section 13.22 of the above-referenced IPMI specification, and may be viewed as comprising an exemplary authentication portion of the IPMI protocol. RAKP generally provides a symmetric-key authentication protocol in which the console 108 and the BMC 114 prove knowledge of a symmetric key to one another and tie this proof of knowledge to the role requested by the console 108.

The symmetric key shared by the console 108 and the BMC 114 is denoted $K_{UID}$ in the IPMI specification, because the key is unique per username, and is also referred to in the IPMI specification as a "password." The two parties prove knowledge of the key to one another by applying a hash-based message authentication code (HMAC) function to certain values including randomly-chosen nonces. The console 108 and BMC 114 may also share another symmetric key $K_G$ that is common across all usernames.

Figure 3A:
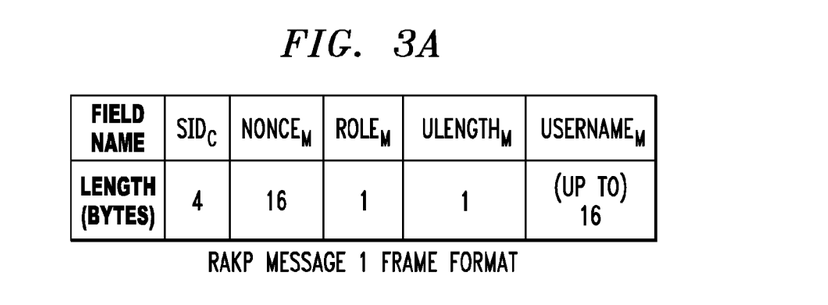
FIGS. 3A and 3B illustrate exemplary IPMI message formats without inclusion of information derived from a credential associated with a particular access control interval.
Figure 3B:
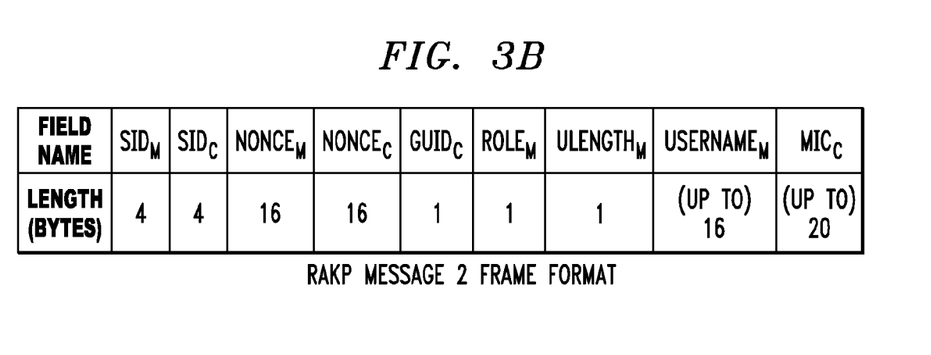

FIGS. 3A and 3B show respective frame formats for RAKP Message 1 and RAKP Message 2, without inclusion of information derived from a credential associated with a particular access control interval. In these and other figures herein, the subscript M denotes a value associated with the remote device 102 and the subscript C denotes a value associated with the managed device 104.

The console 108 determines a username and a requested role and inserts this and other information into corresponding fields of the RAKP Message 1 that is sent to the BMC 114. The SID field more particularly denotes Session ID.

The BMC 114 receives RAKP Message 1 and checks the role and username fields, and if the username is permitted to take on the requested role, responds with RAKP Message 2. In this message, the BMC inserts its random nonce Noncec and a computed message integrity code denoted $MIC_C$ as well as other information. The $MIC_C$ field is computed using an HMAC based on $K_{UID}$, the key unique to the username, as follows:

$$MIC_C = HMAC_{K_{UID}}(SID_M \| SID_C \| Nonce_M \| Nonce_C \| GUID_C \| Role_M \| ULength_M \| Username_M).$$

As mentioned previously, conventional implementations of the IPMI protocol are susceptible to offline password-guessing attacks. For example, assume that $K_{UID}$ is implemented as a static password, such that the BMC 114 uses the static password as the HMAC key in computing the MIC value. For an attacker without knowledge of the password, the MIC value provides an opportunity to mount a password-guessing attack, as all inputs to the HMAC other than the password are known. Such a password-guessing attack typically exploits the tendency of users to pick bad passwords.

Embodiments of the invention eliminate this opportunity for a password-guessing attack at least in part by utilizing information derived from an SSC as the $K_{UID}$ value.

FIGS. 4A through 4D illustrate exemplary IPMI message formats with inclusion of information derived from an SSC associated with a particular access control interval.

Figure 4A:
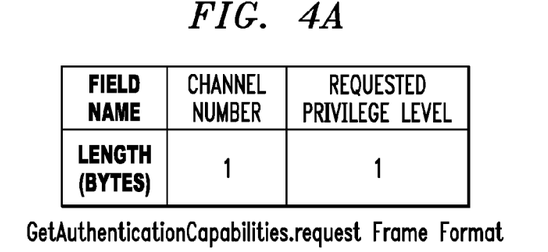
FIGS. 4A through 4D illustrate exemplary IPMI message formats with inclusion of information derived from a credential associated with a particular access control interval.

With reference to FIG. 4A, an exemplary frame format for the GetAuthenticationCapabilities.request message transmitted from the console 108 to the BMC 114 is shown. In this embodiment, the Requested Privilege Level field of the message is set from the Role and Activity field of the SSC APDU format as shown in FIG. 5.

Figure 4B:
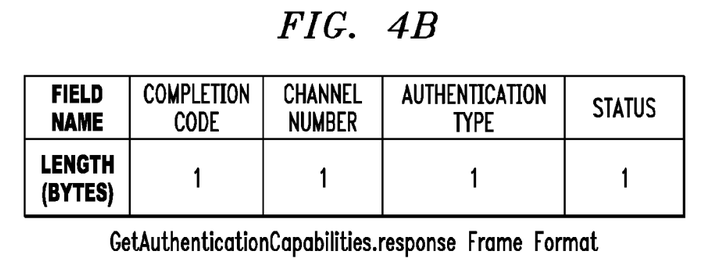

The frame format of the corresponding GetAuthenticationCapabilities.response message transmitted from the BMC 114 to the console 108 is shown in FIG. 4B. This message includes an Authentication Type field that is configured to carry a particular value defined to indicate SSC authentication.

Figure 4C:
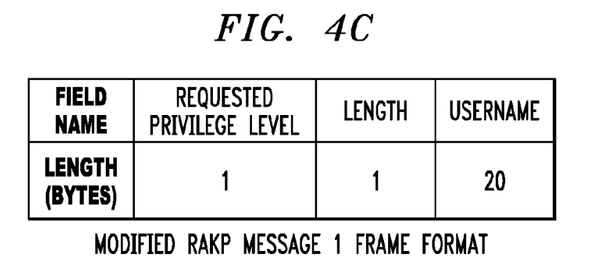

FIG. 4C shows the modified frame format of RAKP Message 1 transmitted from the console 108 to the BMC 114. This message also includes a Requested Privilege Level field that is set from the Role and Activity field of the SSC APDU of FIG. 5. The Username field in this embodiment is set to carry the entire SSC APDU of FIG. 5, including the User ID field, the Role and Activity field and the MAC+IHV field, instead of the actual username that would ordinarily be carried in the Username field.

After receiving the modified RAKP Message 1, the BMC 114 responds with RAKP Message 2 as illustrated in FIG. 3B.

Figure 4D:
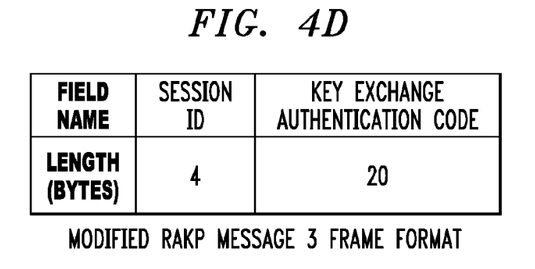

The console 108 then generates modified RAKP Message 3 having the frame format illustrated in FIG. 4D. The KEAC field in the modified RAKP Message 3 frame format does not carry the KEAC itself, but instead carries a result of application of a function to (i) a designated portion of the SSC and (ii) the KEAC. More particularly, the KEAC is computed in the manner described previously, and then a function F(KEAC, SSC Password) is computed, where the SSC Password is a field of the MAC calculation format shown in FIG. 6. The function F may be, for example, a simple encryption operation, such as computing a bit-wise exclusive-or (XOR) of the KEAC and the SSC Password. The result is an encrypted SSC Password, and is sent to the BMC 114 in the KEAC field of the modified RAKP Message 3 of FIG. 4D.

Like the $MIC_C$ field, the KEAC is computed using an HMAC based on $K_{UID}$, the key unique to the username, as follows:

$$KEAC=HMAC_{KUID}(Nonce_C\|SID_M\|Role_M\|ULength_M\|Username_M).$$

The KEAC allows the console 108 to prove to the BMC 114 that it knows $K_{UID}$ and wishes to establish a new session with the given Role and Username. On receipt of the modified RAKP Message 3, the BMC 114 uses its knowledge of $K_{UID}$ to independently compute KEAC. The BMC 114 then uses KEAC to compute the function F(KEAC, SSC Password), and compares the result against the value received in the message. The particular function F to be applied is agreed upon by prior arrangement between the console 108 and the BMC 114.

As a consequence of the length of the KEAC field, the encrypted SSC Password generated by the function F can be up to 20 bytes long. Longer encrypted passwords can be accommodated by applying the function F not to the raw password itself, but instead to a hashed equivalent. Also, one or more salt values can be used in the function computation, such as a previously agreed-upon value that is unique to the BMC 114.

It should be noted that the key $K_{UID}$ in the illustrative embodiments is a secret value based on an SSC corresponding to a particular access control interval, and the HMAC values MIC and KEAC are unpredictable to the attacker. Accordingly, the above-noted password-guessing attack is substantially eliminated. Other security deficiencies associated with use of static passwords are similarly avoided.

FIG. 5 shows the format of an SSC APDU in one embodiment. As mentioned previously, the SSC APDU is an example of what is more generally referred to herein as a "credential." Such a credential in the present embodiment is based at least in part on a message authentication code and an intermediate value of a hash chain. For example, in some embodiments, including those based on the SSC APDU format of FIG. 5, the credential is based on a combination of the message authentication code and the intermediate hash value, with the combination being formed using a designated function. Numerous other credentials based at least in part on a message authentication code and an intermediate hash value may be used in other embodiments, so it should be understood that the SSC APDU of FIG. 5 only one possible example.

The SSC APDU is generated by the central manager 107 and provided to a user associated with the remote device 102.

In order to obtain access to the managed device 104, the user enters the SSC APDU at the remote device 102. The user also enters the password that it utilized to authenticate to the central manager 107 that generates the SSCs. The SSC verification module 118 of the managed device 104 uses the received SSC APDU and user password to authenticate the user and determine an appropriate level of access for that user.

The SSC APDU as illustrated in FIG. 5 comprises a plurality of fields including a User ID field, a Role and Activity field, and another field generated as a combination of a MAC and an intermediate hash value (IHV). The latter field is more particularly denoted as a MAC+IHV field in the figure. The SSC APDU is shown in binary format, and the User ID, Role and Activity and MAC+IHV fields have respective widths of 16 bits, 6 bits and 50 bits, although these and other field widths referred to herein are presented by way of illustrative example only and should not be construed as limiting in any way.

The User ID is a numeric identifier that maps to individual users in the central manager 107. The particular values of the User ID may be selected from within a predetermined range. In the present example, the 16-bit User ID field provides a range of $2^{16}=65536$ values, which may be denoted as 0-65535. The User ID is used in all the audit-log entries to identify the user along with the associated authentication actions (login, logoff, etc.). Additionally, applications in the protected resources 104 may log audit messages using the User ID to track product-specific actions of the user.

The Role and Activity field indicates one of up to $2^6=64$ different possibilities in this embodiment. The specific meanings of the field may be specific to particular products. For example, Symmetrix storage arrays selectively disable certain commands in a user shell. These and other products can use the Role and Activity field to determine an appropriate level of access for a given user.

The various bits of the Role and Activity field can be separated between roles and activities in a variety of different ways. For example, the 6 bits of the field can be evenly split, with 3 role bits being used to indicate a particular one of 8 different roles and 3 activity bits being used to indicate one of 8 possible activities for each of the roles. As indicated above, different field sizes can be used in other embodiments. For example, one alternative SSC APDU format could utilize an 8-bit Role and Activity field, in order to support 16 different roles each with 16 possible activities.

The MAC+IHV field is a combination of a MAC and an IHV of a particular hash chain, and is assumed in the present embodiment to be formed as a bit-wise XOR of the MAC and the IHV, although other techniques for combining the MAC and IHV may be used. The particular hash chain is generated by the central manager 107 using a hash function and an initial value. The corresponding final value of the hash chain is stored in the managed device 104. The MAC portion of the MAC+IHV field is generated by performing a MAC calculation over the MAC calculation inputs shown in the exemplary MAC calculation format of FIG. 6. These MAC calculation inputs include the password provided by the user in creating the corresponding user account with the central manager 107.

Numerous alternative formats are possible for the SSC APDU. Another exemplary format includes in addition to the three fields of FIG. 5 two other fields that collectively provide an indication of a time period for which the SSC APDU is valid. These two additional fields comprise a Start Hour field indicating a start time of the particular access control interval, and a Duration field indicating the duration of the particular access control interval. The Start Hour and Duration fields in this example are each 13 bits in width. Other arrangements of one or more time period indicator fields may be used in other embodiments.

Also, it is possible for the remote device 102 to provide a start time to the central manager 107 upon requesting an SSC. The central manager 107 can utilize this start time or other types of time information to determine an appropriate intermediate hash value.

The SSC APDU of FIG. 5 is illustrated in binary format, but this binary format is assumed to be subsequently encoded so as to reduce the number of digits relative to the binary format, thereby facilitating presentation of the SSC APDU to a user and user entry of the SSC APDU into the remote device 102. This encoding can be performed in the central manager 107 or other system entity that generates the SSC APDU. The term "credential" as used herein should be understood as encompassing binary or encoded formats, as well as other types of formats.

The encoding of the binary format SSC APDU of FIG. 5 may be implemented, for example, using Base 64 encoding. Base 64 encoding generally converts groups of three octets of binary digits in the binary format into corresponding groups of four encoded characters in the encoded format. Accordingly, the 72 bits or nine octets of the FIG. 5 binary format SSC APDU can be represented as an encoded string of 12 characters. Numerous alternative encoding processes may be used in other embodiments. Also, depending on the widths of the fields, padding may be used as appropriate in these encoding processes, as will be readily appreciated by those skilled in the art.

As mentioned previously, FIG. 6 shows an exemplary MAC calculation format comprising a set of inputs used in calculating a MAC for inclusion in the MAC+IHV field of the SSC APDU in an illustrative embodiment. The MAC calculation inputs are also collectively referred to herein as a "message payload." In this embodiment, the MAC is calculated over a message payload comprising a set of inputs that includes the user password, a Year field, a Time Window field, a Version field, a User ID field and a Role and Activity field. The user password in the present embodiment is assumed to be the same password that the user submits in conjunction with account creation and user authentication processes performed by the central manager 107. It has a width that is listed in the figure as to be determined or TBD, based on password parameters established in the system 100. The fields denoted Year, Time Window, Version, User ID and Role and Activity fields have respective widths of 8, 8, 2, 16 and 6 bits, as indicated in the figure. In other embodiments, alternative fields and field lengths may be used.

The SSC APDU in the present embodiment is configured to be valid for the duration of a time window as specified in the Time Window field. The time window may represent a range of dates using an integer. Numerous alternative arrangements are possible. For example, in another embodiment, the time window can be specified as one of $2^n$ different possible values of SSC duration using n bits, where the duration indicates the period of time for which the SSC is valid, such as a particular number of days. Thus, for example, four different possible durations each comprising a different number of days can be supported using a 2-bit Time Window field, such as durations of 2, 5, 7 and 10 days.

Like the password, the time window is utilized in calculating the MAC that is included in the SSC APDU, but is not otherwise explicitly sent to the user as part of the SSC APDU. If the SSC verification module 118 receives an SSC APDU from a user outside of the time window specified in the corresponding MAC, access to the corresponding managed device 104 is denied. If the SSC APDU is received near an edge of a particular time window, the SSC verification module 118 may check it against the previous or following window as appropriate in order to account for clock drift.

Figure 6:
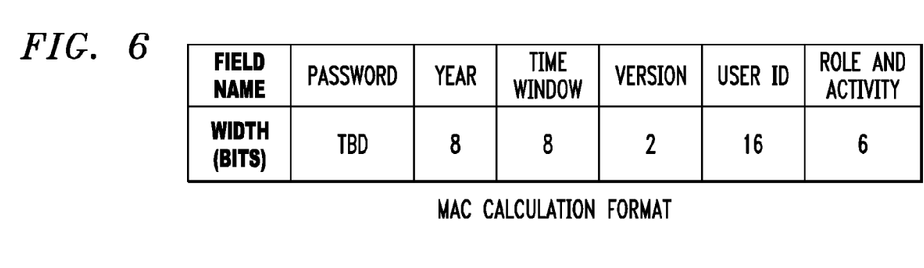
FIG. 6 shows an exemplary calculation format for generating the message authentication code used in the credential of FIG. 5.

The Year field used in the MAC calculation illustrated in FIG. 6 can be configured to specify an actual year. Other types of year-related information can additionally or alternatively be used, such as a number of days elapsed since a designated start year.

As mentioned previously, the managed device 104 in the present embodiment is not provisioned with the user password. Accordingly, the SSC APDU is generated utilizing the password and the valid time window as part of the MAC calculation. This allows the SSC verification module 118 to use the SSC APDU to validate the password submitted in conjunction with an access attempt.

The SSC APDU as illustrated in FIG. 5 does not explicitly carry the password, as it is assumed that the user enters the password into the remote device 102 as part of the access attempt. Similarly, the SSC APDU of FIG. 5 does not explicitly carry the Year and Time Window fields, but instead these fields are used in the MAC calculation that generates the MAC for inclusion in the MAC+IHV field of the SSC APDU. It is assumed that the managed device 104 can independently determine the current time window.

In other embodiments, the SSC APDU can be configured to explicitly carry a Time Window field. For example, the 72-bit SSC APDU of FIG. 5 can be modified in a different embodiment to include a 16-bit User ID field, a 4-bit Role field, a 4-bit Activity field, a 2-bit Time Window field and 46-bit MAC+IHV field. Again, numerous other arrangements of fields and field lengths are possible.

In the MAC calculation format of FIG. 6, the message payload more particularly comprises a concatenation of the fields:

Payload=Password||Year|| . . . ||Role and Activity.

The MAC calculation performed over this message payload illustratively utilizes a MAC key having a key size of 128 bits, and performs the calculation in accordance with the hashing algorithm HMAC-SHA-256. Numerous other techniques may be used to generate MACs in other embodiments.

As noted above, the SSC APDU comprises a combination of the calculated MAC and an IHV for a particular access control interval. The IHV is one of a plurality of intermediate values of a given hash chain also having initial and final values. These intermediate values of the hash chain are associated with respective ones of the access control intervals. The final value of the hash chain is provided to the managed device 104. The final value of the hash chain is illustratively provided to the managed device 104 by the central manager 107 in embodiments in which the central manager 107 generates the SSCs.

In generating the hash chain providing the intermediate values, the selected hash function is applied to the initial value a designated number of times to generate each intermediate value. Each of the resulting intermediate values is assumed to be truncated to 50 bits in the present embodiment in order to limit the size of these values to the available size of the MAC+IHV field in the SSC APDU.

By way of example, each intermediate value of a given hash chain may be generated using SHA-256 iterated 100,000 times. A 128-bit cryptographic key may be used as the initial value. This is assumed to be a secret value that is stored as one of a plurality of initial values in the central manager 107 or other entity that generates the SSCs and is not accessible to the managed device 104 and its SSC verification module 118.

At initialization, the number of access control intervals to be supported is determined. For example, using a time window of 4 days, a given year will have 92 windows. To provide access control over a total period of 20 years, the hash chain should be configured with 1,840 intermediate values in order to support respective ones of the 1,840 windows, each corresponding to an access control interval. Of course, these particular values are merely examples, and numerous other alternative values may be used as appropriate to the needs of a given implementation.

The final value of the hash chain is obtained after 1,841 steps in each of which SHA-256 is iterated 100,000 times and the resulting output is truncated to 50 bits. The first step is applied to the initial value and the final step provides the final value, with each of the first 1,840 steps generating an intermediate value that will be used in generating SSC APDUs for a corresponding one of the 1,840 access control intervals. The final value of the hash chain may be considered a public value and is deployed on the managed device 104 and possibly one or more additional managed devices. As noted above, it is assumed that a given such managed device does not have access to the initial value and therefore has no ability to compute intermediate values from the initial value. Instead, it applies an appropriate number of hash iterations to a received intermediate value to determine if the result matches the final value.

Thus, in the above-described example, a given intermediate value is generated by repeatedly hashing the previous value in the chain 100,000 times and then outputting the most significant 50 bits of the 256-bit result. After outputting the most significant 50 bits of the intermediate value, the remaining bits are set to zero before starting the 100,000 hash iterations for the next value. This process is also referred to herein as "flattening" the hash chain values, and is utilized in the present embodiment due to the 50 bit width limitation of the MAC+IHV field of the SSC APDU.

The following pseudocode illustrates the hash chain generation process in the above-described example:
1. Temp=Initial
2. Repeat the following 1840 times:
   a. Repeat the following 100,000 times:
      i. Temp=SHA-256(Temp)
   b. Output truncate(Temp, 50).

As long as the selected hash function is a one-way function and the initial value remains secret, obtaining the final value does not help an attacker.

The hash function for each step is iterated 100,000 times to slow down a potential brute-force attacker.

It should be noted that this exemplary hash chain generation can be performed quickly on a modern processing device. For example, a processing device based on an Intel Core i7 processor with 10 cores running at 2.4 GHz can perform about 20 million hashes per second, such that all of the 1,840 intermediate values and the final value of the hash chain described above can be generated in less than 9 seconds.

Consider an attacker that obtains an intermediate hash value for one access control interval. In order for the attacker to determine the intermediate hash value for the next access control interval, the attacker must find a value that when hashed 100,000 times yields the value held by the attacker. Even with many processing devices of the type described above, this will take far longer than the duration of the next access control interval.

The intermediate values are associated with respective access control intervals in the process of generating the SSCs. As mentioned previously, the final value can be a public value and may be deployed on multiple managed devices without providing any ability to compute intermediate values from an initial value. Instead, the initial value is securely stored as indicated above, and the intermediate values are used in generating SSC APDUs for respective access control intervals. This involves associating the intermediate values with the access control intervals.

In the present embodiment, a first one of the intermediate values immediately following the initial value of the hash chain is associated with a final one of the access control intervals, and this reverse ordering continues through the intermediate values until a final one of the intermediate values immediately preceding the final value of the hash chain is associated with a first one of the access control intervals.

Thus, the first access control interval corresponds to the intermediate value immediately preceding the final value, such that hashing that intermediate value once yields the final value. Similarly, the second access control interval corresponds to the intermediate value that precedes the final value by two positions, such that hashing that intermediate value twice yields the final value. This inverse numbering continues with later access control intervals corresponding to respective intermediate values that are closer to the initial value and which therefore must be hashed more times to yield the final value. A more detailed example of this type of association between hash chain intermediate values and access control intervals will be described below in conjunction with FIG. 7.

The final value of the hash chain is deployed on the managed device 104 by providing it to the SSC verification module 118. As mentioned above, the final value from the same hash chain can be provided to each of a plurality of managed devices, or different final values generated for different hash chains can be provided to each of the managed devices. The final values in the present embodiment are considered public values and accordingly do not need to be provided over a secure channel.

An intermediate value associated with a particular interval is utilized to generate an SSC APDU as a credential to access the managed device 104 during that interval.

Upon receipt of the SSC APDU from the remote device 102 in conjunction with an access attempt, the intermediate value can be extracted from the SSC APDU and hashed an appropriate number of times to determine if the final value is obtained, as part of the process for authenticating the SSC in the SSC verification module 118.

An exemplary process for authenticating an SSC may be as follows, assuming use of the SSC APDU format of FIG. 5 and the MAC calculation format of FIG. 6.
1. Prompt the user for the SSC APDU and password.
2. Compute a purported MAC using the supplied password, known Year, Time Window and Version information, and the User ID and Role and Activity fields extracted from the SSC APDU.
3. Perform a bit-wise XOR of the purported MAC with the MAC+IHV field of the SSC APDU to yield a purported IHV.

4. Validate the purported IHV by hashing it an appropriate number of times and comparing the result to the stored final value.

If the purported IHV is validated, the remote device 102 is authenticated and is given access to the managed device 104, although grant of access may possibly be conditioned on one or more additional checks beyond validation of the purported IHV.

Otherwise, the attempt is rejected.

As noted above, additional checks may be incorporated into the authentication process. For example, disable limit counters may be maintained that count the number of unsuccessful authentication attempts by a particular user within a given time frame. Further authentication attempts by that user after a specified disable limit has been reached may be automatically rejected.

Also, a check of the current time may be performed against a stored "high water mark." In embodiments that utilize time intervals such as such as hours, days, weeks or months to define access control intervals, the SSC verification module 118 may be configured to incorporate or otherwise access a clock in order to determine how many times to hash the intermediate value before the final value is reached. When the clock reaches the start of a predetermined access control interval, the SSC verification module 118 records this high water mark to disk or other nonvolatile storage. Then, during the validation of an intermediate value, the SSC verification module 118 checks the current clock value against the stored high water mark. If the current clock value precedes the high water mark in time, the authentication request is rejected and additional auditing actions may be taken such as, for example, recording the suspected clock tampering incident to a log, or alerting an administrator.

The high water mark may be recorded, for example, in a Last Login field of a secure data structure of the SSC verification module 118 as the latest time window for which a valid SSC APDU has been received by that module.

The computation of the purported MAC in the above-described exemplary protocol utilizes the provisioned MAC key provided to the managed device 104 by the central manager 107 or other SSC-generating entity via a secure channel. This key may be stored in the above-noted secure data structure or other secure storage location of the managed device 104 or its SSC verification module 118. The computation uses the same HMAC-SHA-256 hashing algorithm used in calculating the MAC for inclusion in the SSC.

As noted above, in an embodiment utilizing the SSC APDU format of FIG. 5, the current time window is not explicitly included in the SSC APDU. Instead, access control intervals corresponding to respective fixed time windows are utilized and it is assumed that the SSC verification module 118 knows the current time window.

Alternative formats may be used that explicitly carry an indication of time in the SSC APDU. This approach has the advantage of specifying the particular time period for which the SSC APDU is valid. In the context of the example given above, as there are 8,760 hours in a year, Start Hour and Duration fields may be included in the SSC APDU and used to uniquely indicate respective starting and ending hours. Alternative time indication arrangements could be used to reduce the bit widths of these fields.

Figure 7:
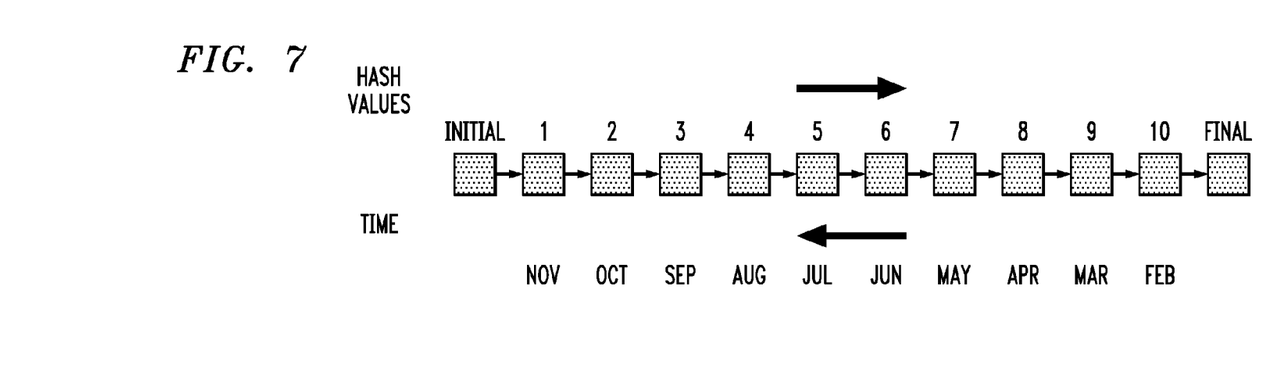
FIG. 7 is a diagram illustrating one possible technique for associating intermediate values of a hash chain with respective access control intervals in the FIG. 1 system.

Referring now to FIG. 7, an example of one possible association between intermediate hash values and respective access control intervals is shown. This may be viewed as an example of a time-synchronous embodiment in which the hash chain intermediate values correspond to access control intervals defined by discrete periods of time. More particularly, in this example, the access control intervals are defined as respective months.

Starting from an initial value, the steps of the previously-described hash chain generation are iterated 11 times to produce a sequence of 10 intermediate values numbered 1 through 10 followed by a final value, with the hash iteration process being indicated by the right-facing arrow.

The final value itself is not used to generate a valid credential, but the intermediate value 10 that immediately precedes it is used to generate a valid credential. This last intermediate value 10 is associated with the first access control interval, which is the month of February in this example. The other intermediate values 9 through 1 are then associated with the other access control intervals, continuing in the reverse ordering indicated by the left-facing arrow. More particularly, intermediate values 9 through 1 are associated with respective access control intervals denoted in the figure as March, April, May, June, July, August, September, October and November Thus, in the present embodiment, the intermediate values at the end of the hash chain are associated with the earliest access control intervals.

Although months are used in this example, other time intervals such as hours, days or weeks may be used to define access control intervals in other embodiments.

Embodiments of the invention can be configured to provide a one-time passcode mechanism where each intermediate hash value and its corresponding SSC APDU or other credential is used only once, and then discarded.

In one possible arrangement of this type, there is assumed to be only one verifier checking the intermediate hash value from the SSC APDU against the stored final value. The verifier in this embodiment is the SSC verification module 118 of the managed device 104, although other system entities can serve as verifiers in other embodiments. After an SSC APDU based on a given intermediate hash value is used, the SSC APDU or the given intermediate hash value is then marked as used by the verifier, and cannot be used again. This makes the corresponding SSC APDU a single-use code, and allows the system to defend against a replay of a previously issued SSC APDU.

For example, the last used SSC APDU or the intermediate hash value on which it is based may be associated with the previously-described "high water mark" such that this SSC APDU and all previously used SSC APDUs are no longer valid. Even if one or more intermediate hash values have not been used, for example, if hash value 10 of FIG. 7 was never seen by the verifier, and the verifier sees hash value 8, the verifier would set the high water mark at hash value 8, and disallow any future use of hash values 8, 9, or 10. Such an arrangement advantageously prevents replay of an old SSC APDU. It also prevents other attacks in which the attacker tries to intercept an intermediate hash value and use it to generate other intermediate hash values closer to the final value.

Instead of maintaining a separate high water mark, the verifier could instead simply update the stored final value to the hash value of the last valid SSC APDU. For example, if the verifier sees hash value 8 of FIG. 7, the verifier would simply prune the hash chain making hash value 8 the new final value. As a result, there would be no way for an attacker to ever use hash value 8, or the now non-existent hash values 9 or 10. This also makes subsequent authentications more efficient, in that fewer applications of the hash function will be required to reach the new final value, while also maintaining protection against the attacks described previously.

It is to be appreciated that the particular credential and message formats and related processing techniques described in conjunction with FIGS. 3 through 7 are presented by way of example only, and should not be construed as limiting the scope of the invention in any way. Numerous other credential and message formats and related processing techniques may be used in other embodiments.

In some embodiments, the central manager 107 can delegate to another system entity, such as the remote device 102, an ability to generate credentials for a limited time period comprising multiple access control intervals. Delegation of SSC APDU generation capability by the central manager 107 can be configured so as to allow the remote device 102 to generate these values without having a network connection to the central manager 107.

This delegation functionality may be achieved by making the provisioned MAC key vary with time. For example, the MAC key values can be periodically rotated in a manner similar to the variation of the IHVs over time. One way to implement such rotation is to configure the MAC key values as respective intermediate values of another hash chain, although other types of key derivation functions may be used. In these and other arrangements, the managed devices are configured to automatically rotate their MAC key values at predetermined time intervals, such as once a week. Each time interval is associated with a different MAC key corresponding to an intermediate value from a hash chain. The managed devices are therefore provisioned with initial and final values of this additional hash chain, in addition to the final value of the hash chain used to produce the IHVs that are incorporated into the SSC APDUs. The managed devices can determine the current time and therefore know which of the MAC keys to use at any particular time.

Delegation arrangements of the type described above allow the central manager 107 to grant a remote device or other designated system entity the ability to generate SSC APDUs for a limited period of time. If an additional hash chain is used to rotate the MAC key values, the central manager 107 simply has to selectively release to the system entity a particular subset of the IHV and MAC key values from their respective hash chains. The system entity cannot invert either of the corresponding hash functions and therefore can only generate the delegated part of each hash chain.

This is particularly useful in the context of disaster resilience, in that the central manager 107 could release future IHV and MAC key values to an offshore or cloud repository for some limited time period, thereby allowing the repository to issue SSC APDUs in the event the central manager 107 becomes inaccessible.

It should be noted that the system entity to which the central manager 107 delegates an ability to generate SSC APDUs could be a software entity of the system, such as a program running on a Hardware Security Module (HSM) that additionally imposes its own access control provisions.

The illustrative embodiments described above provide secure access to protected resources by generating credentials for respective access control intervals using, for example, both message authentication codes and intermediate values of a hash chain. One or more such embodiments advantageously provide secure credentials that have a limited number of characters and can therefore be easily entered by a user at a terminal or other user device. Moreover, enhanced security is provided through features such as iterating the hash function, separately computing a message authentication code using received authentication information such as a user password, and combining an intermediate hash value and a message authentication code into an SSC APDU or other credential using a function such as XOR.

It is to be appreciated that the particular set of elements shown in FIG. 1 for providing access control based on SSC APDUs or other credentials generated for respective access control intervals is presented by way of example, and in other embodiments additional or alternative elements may be used. Thus, another embodiment may include additional networks and additional sets of remote and managed devices or other types of processing devices.

As indicated previously, various elements of system 100, such as remote device modules 110 and 112 and managed device modules 116 and 118, may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

The disclosed techniques are applicable to a wide range of different types of remote and managed devices or other protected resources.

In some embodiments, the hash chain intermediate values correspond to access control intervals defined by discrete periods of time, although it is to be appreciated that other techniques may be used to define access control intervals in other embodiments.

In generating SSCs, a particular hash function, an initial value and the number of time intervals to be supported are determined. As indicated previously, various known one-way hash functions such as MD5, SHA-1 and SHA-256 may be used as the hash function. Also, a cryptographic key may be selected as the initial value. The initial value must be protected in order to protect the security of the access control process, and accordingly should be stored in a secure memory accessible only to the credential generation module or its associated central manager 107. The number of time intervals to be supported may be selected to accommodate at least the expected useful lifetime of the managed device. As an illustrative example, if the time intervals have a duration of one month, generating a hash chain having about 10,000 intermediate values would handle many more years than the expected lifetime of the managed device.

In an embodiment involving multiple hash chains having distinct initial values, where different final values are provided to different managed devices, the distinct initial values of the respective hash chains may be derived from a common key. For example, each of the managed devices may have associated identifying information, and the distinct initial values of the respective hash chains used to protect access to the respective managed devices may each be determined as a function of the common key and the identifying information for the corresponding managed device.

It is also possible to use the same base hash chain configuration to produce multiple distinct final values. For example, one could combine an identifier of the managed device 104 with a common initial value using addition, XOR or other similar function.

In some embodiments, efficiency advantages can be gained by replacing a linear hash chain with one based on a tree structure. For example, a given hash chain may comprise a tree having one or more interior branches each defined by application of a one-way hash function to a common key and identifying information.

The illustrative embodiments described above can provide a number of significant advantages relative to conventional practice. For example, some of these embodiments implement a remote management interface that is compliant with the above-noted IPMI specification but avoids the use of static passwords while also substantially eliminating the possibility of offline password-guessing attacks. Other advantages such as more flexible user account management are also provided. Moreover, embodiments can be configured to retain "on-the-wire" binary compatibility with existing IPMI installations. The credential generation and processing techniques disclosed herein can therefore be readily deployed at low cost using existing IPMI infrastructure.

It is therefore apparent that the disclosed embodiments can facilitate remote access to managed devices while avoiding the static password vulnerability associated with conventional arrangements. For example, the use of credentials based on both message authentication codes and intermediate hash values in some embodiments can ensure that compromise of information that is used to validate credentials for one managed device does not jeopardize the security of other managed devices.

Embodiments of the invention can be implemented in a wide variety of remote management contexts including many different otherwise conventional systems that implement "out-of-band management" or "lights out management."

Authentication information and SSC APDUs may be communicated between the remote device 102 and the central manager 107 using any of a number of different communication mechanisms, some of which may involve network connections established over the network 106. For example, such communications may be implemented using a web login, SMS text messages, or other techniques.

As mentioned above, the information processing system 100 of FIG. 1 may be implemented using a processing platform comprising at least one processing device having a processor coupled to a memory. One or more of the processing modules or other components of system 100 may therefore each run on a computer, server, storage device or other processing platform element. A given such element may be viewed as an example of what is more generally referred to herein as a "processing device."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platforms and processing device configurations. Also, different arrangements of remote and managed devices, central managers, networks, remote management interfaces, credential formats and access control processes may be used. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
    obtaining a credential associated with a particular access control interval;
    inserting information derived from the credential into one or more messages of a remote management interface protocol;
    transmitting the one or more messages to a managed device; and
    remotely controlling the managed device responsive to a successful authentication based at least in part on the inserted information;
    wherein inserting information derived from the credential into one or more messages of the remote management interface protocol further comprises:
    inserting first information derived from a role field of the credential into a first type of message of the remote management interface protocol; and
    inserting second information derived from a combined message authentication code and intermediate value field of the credential into a second type of message of the remote management interface protocol.

2. The method of claim 1 wherein said obtaining, inserting, transmitting and remotely controlling are performed by at least one processing device comprising a processor coupled to a memory.

3. The method of claim 2 wherein said at least one processing device comprises a remote device configured to communicate with the managed device over a network.

4. The method of claim 1 wherein the one or more messages of the remote management interface protocol are compliant with a designated Intelligent Platform Management Interface (IPMI) specification.

5. The method of claim 1 wherein transmitting the one or more messages comprises transmitting the one or more messages as part of an authentication portion of the remote management interface protocol.

6. The method of claim 1 wherein the information derived from the credential comprises at least a portion of the credential itself.

7. The method of claim 1 wherein the credential associated with the particular access control interval is generated based at least in part on a corresponding intermediate value of a hash chain.

8. The method of claim 7 wherein the credential associated with the particular access control interval is generated based at least in part on a message authentication code and the corresponding intermediate value of a hash chain.

9. The method of claim 7 further comprising:
    obtaining an initial value of the hash chain;
    hashing the initial value a designated number of times to obtain a final value of the hash chain; and
    associating intermediate values of the hash chain with respective access control intervals; and
    providing the final value of the hash chain to the managed device.

10. The method of claim 1 wherein inserting first information derived from the role field of the credential into the first type of message of the remote management interface protocol comprises inserting role information into a requested privilege level field of the first type of message.

11. The method of claim 1 wherein inserting second information derived from the combined message authentication code and intermediate value field of the credential into the second type of message of the remote management interface protocol comprises inserting a result of application of a function to (i) a designated portion of the credential and (ii) a computed key exchange authentication code into a key exchange authentication code field of the second type of message.

12. A non-transitory processor-readable storage medium having stored therein program code of one or more software programs, wherein the program code when executed by at least one processing device causes said at least one processing device:
to obtain a credential associated with a particular access control interval;
to insert information derived from the credential into one or more messages of a remote management interface protocol;
to transmit the one or more messages to a managed device; and
to remotely control the managed device responsive to a successful authentication based at least in part on the inserted information;
wherein inserting information derived from the credential into one or more messages of the remote management interface protocol further comprises:
inserting first information derived from a role field of the credential into a first type of message of the remote management interface protocol; and
inserting second information derived from a combined message authentication code and intermediate value field of the credential into a second type of message of the remote management interface protocol.

13. An apparatus comprising:
at least one processing device comprising a processor coupled to a memory;
the processing device being configured:
to obtain a credential associated with a particular access control interval;
to insert information derived from the credential into one or more messages of a remote management interface protocol;
to transmit the one or more messages to a managed device; and
to remotely control the managed device responsive to a successful authentication based at least in part on the inserted information;
wherein inserting information derived from the credential into one or more messages of the remote management interface protocol further comprises:
inserting first information derived from a role field of the credential into a first type of message of the remote management interface protocol; and
inserting second information derived from a combined message authentication code and intermediate value field of the credential into a second type of message of the remote management interface protocol.

14. The apparatus of claim 13 wherein said at least one processing device comprises a remote device configured to communicate with the managed device over a network.

15. A method comprising:
receiving in a managed device one or more messages of a remote management interface protocol;
extracting from the one or more messages information derived from a credential associated with a particular access control interval; and
permitting remote control of the managed device responsive to a successful authentication based at least in part on the extracted information;
wherein extracting from the one or more messages information derived from the credential further comprises:
extracting first information derived from a role field of the credential from a first type of message of the remote management interface protocol; and
extracting second information derived from a combined message authentication code and intermediate value field of the credential from a second type of message of the remote management interface protocol.

16. The method of claim 15 wherein the credential associated with the particular access control interval is generated based at least in part on a corresponding intermediate value of a hash chain.

17. The method of claim 16 wherein the authentication comprises:
identifying the particular access control interval;
determining a number of hash iterations associated with the particular access control interval;
applying the number of hash iterations to the intermediate value; and
comparing a result of the applying to a final value of the hash chain.

18. A non-transitory processor-readable storage medium having stored therein program code of one or more software programs, wherein the program code when executed by at least one processing device causes said at least one processing device:
to receive in a managed device one or more messages of a remote management interface protocol;
to extract from the one or more messages information derived from a credential associated with a particular access control interval; and
to permit remote control of the managed device responsive to a successful authentication based at least in part on the extracted information;
wherein extracting from the one or more messages information derived from the credential further comprises:
extracting first information derived from a role field of the credential from a first type of message of the remote management interface protocol; and
extracting second information derived from a combined message authentication code and intermediate value field of the credential from a second type of message of the remote management interface protocol.

19. An apparatus comprising:
at least one processing device comprising a processor coupled to a memory;
the processing device being configured:
to receive one or more messages of a remote management interface protocol;
to extract from the one or more messages information derived from a credential associated with a particular access control interval; and
to permit remote control of the processing device responsive to a successful authentication based at least in part on the extracted information;
wherein extracting from the one or more messages information derived from the credential further comprises:
extracting first information derived from a role field of the credential from a first type of message of the remote management interface protocol; and
extracting second information derived from a combined message authentication code and intermediate value field of the credential from a second type of message of the remote management interface protocol.

20. The apparatus of claim 19 wherein said at least one processing device comprises a managed device configured to communicate with a remote device over a network.

* * * * *